United States Patent [19]

Ogawa

[11] Patent Number: 5,305,559
[45] Date of Patent: Apr. 26, 1994

[54] METHOD OF GRINDING CORE BLANK FOR MAGNETIC HEADS, USING MARKERS FOR DETERMINING GRINDING DEPTH FOR NOMINAL MAGNETIC GAP DEPTH

[75] Inventor: Hirofumi Ogawa, Iwakura, Japan

[73] Assignee: NGK Insulators, Ltd., Japan

[21] Appl. No.: 53,705

[22] Filed: Apr. 29, 1993

[30] Foreign Application Priority Data

May 12, 1992 [JP] Japan .................. 4-146625

[51] Int. Cl.$^5$ .......................... B24B 7/00; B24B 49/04
[52] U.S. Cl. .................. 51/323; 51/281 R; 51/165 R; 51/327
[58] Field of Search .......... 51/165.71, 165.75, 323, 51/281 R, 165 R, 327, 326

[56] References Cited

U.S. PATENT DOCUMENTS 3,821,815  6/1974  Abbott et al. ............ 51/281 R
4,155,106  5/1979  Muraoka et al. .......... 51/281 R
4,511,942  4/1985  Valstyn ................... 51/281 R

FOREIGN PATENT DOCUMENTS 53-142214  12/1978  Japan .
56-111120   9/1981  Japan .

OTHER PUBLICATIONS

"Throat Height Determination Techniques for Inductive Heads"; Cheatham, et al.; IBM Technical Disclosure Bulletin; vol. 21, No. 9 (Feb. 1979).
"Polishing Apparatus"; Grandison; IBM Technical Disclosure Bulletin; vol. 13, No. 4 (Sep. 1970).
"Method For Reducing Grinding Damage in MR Heads"; Daughenbaugh, et al. IBM Technical Disclosure Bulletin; vol. 21, No. 9 (Feb. 1979).

*Primary Examiner*—Robert A. Rose
*Attorney, Agent, or Firm*—Parkhurst, Wendel & Rossi

[57] ABSTRACT

A method of grinding a core blank which yields at least one head core each used for a magnetic head, each head core having an annular magnetic path having a magnetic gap, the core blank having a working surface that is to be opposed to a magnetic recording medium is disclosed. According to the present grinding method, at least one marker is formed by photolithography so that the marker(s) is/are embedded in the core blank. Each marker has two edges which are spaced from each other in a direction of width of the magnetic gap, by a first distance that continuously varies in a direction of depth of the magnetic gap, the two edges of each marker being located on the same side as viewed in the gap-width direction. During grinding of the core blank, the first distance between the two edges of each marker which is exposed on the working surface under grinding is measured, so as to determine a required residual depth of grinding which is to be further effected to establish a nominal depth dimension of the magnetic gap.

9 Claims, 8 Drawing Sheets

METHOD OF GRINDING CORE BLANK FOR MAGNETIC HEADS, USING MARKERS FOR DETERMINING GRINDING DEPTH FOR NOMINAL MAGNETIC GAP DEPTH

BACKGROUND OF THE INVENTION

1. Field of the Invention

The present invention relates generally to a method of grinding a core blank for forming a magnetic head or heads, and more particularly to such a grinding method that permits the core blank to yield at least one head core each having a magnetic gap whose depth dimension is easily controlled to a predetermined value with high accuracy.

2. Discussion of the Prior Art

There are conventionally used various types of head cores each used for a magnetic head for a video tape recorder (VTR), floppy disk drive (FDD), rigid disk drive (RDD), digital audio tape (DAT), or other devices, each head core having an annular or closed magnetic path, and a magnetic gap formed in the magnetic path. Known examples of the head cores may include: a head core for a bulk-type magnetic head in which ferrite cores define a magnetic path; a head core for a thin-film type magnetic head in which magnetic thin films or layers define a magnetic path; a monolithic type head core having a slider as an integral part thereof; and a composite type head core having a slider as a separate body. Also known is a MIG (Metal-In-Gap) head core having a magnetic gap in which is provided a metallic magnetic film having a high magnetic flux density.

To meet with the recent tendency toward a high recording density of a magnetic recording medium such as a magnetic disk, the magnetic head cores as indicated above need to be fabricated with high processing accuracy. In particular, the depth dimension of the magnetic gap needs to be controlled to a predetermined or nominal value with high dimensional accuracy on the order of several microns, since the gap depth has a great influence on an electro-magnetic or magneto-electric conversion efficiency. The above-indicated depth dimension is construed as the depth of the magnetic gap which extends from a sliding surface of the head core that is opposed to a magnetic recording medium for sliding contact therewith, to an apex of a coil-winding groove formed in the head core, which apex is located remote from the sliding surface. This apex defines the innermost end of the magnetic gap.

After formation of a core blank which, after grinding and other finishing steps, provides at least one head core each having an annular magnetic path with a magnetic gap, the core blank is ground at its surface that is to be opposed to a magnetic recording medium, so as to establish the final depth dimension of the magnetic gap. During this grinding operation, it is extremely difficult to directly measure or observe the currently established gap depth at a side surface of the core blank perpendicular to the grinding surface thereof, since a core portion of a thin-film type magnetic head, for example, is usually covered by a thick protective layer having a thickness of several tens of microns.

In view of the above, a method of grinding a core blank for a magnetic head having a magnetic gap is disclosed in JP-A-53-142214. This method employs markers of a triangle or other shape, which are formed by photolithography in the core blank such that each marker has opposite edges that are spaced from each other in the direction of width of the magnetic gap, by a distance that continuously varies in the direction of depth of the gap. During the grinding operation, the distance between the opposite edges of each marker that is exposed on the grinding surface of the core blank is measured so as to determine the required depth of grinding that should be further effected to establish the nominal depth dimension of the magnetic gap, that is, the distance between the currently ground surface and a grinding depth line which defines the nominal gap depth. According to this method, therefore, the required residual grinding depth or amount can be easily determined.

However, a further study on the above grinding method by the present inventor revealed that the accuracy in measuring the distance between the opposite edges of each marker is unsatisfactory or poor, whereby it is difficult to establish the nominal depth dimension of the magnetic gap with sufficiently high accuracy. Namely, the distance between the opposite edges of the marker, i.e., the width dimension of the marker, must highly accurately correspond to the distance between the currently ground surface of the core blank and the above-indicated grinding depth line, which distance indicates the required residual depth of grinding that should be further effected on the core blank.

The marker used in the above method is formed by using a resist film that is formed by photolithography on a substrate or a thin film formed on the substrate. This resist film is patterned into the shape of the marker to be formed, so that the substrate or thin film is then processed by plating or etching to form the marker corresponding to the resist pattern. In this case, the dimensions of the resist pattern may deviate from the nominal values, due to variation of the thickness of the resist film, fluctuating conditions of development of the resist pattern, and other factors. Further, the dimensions of the marker eventually obtained may be shifted or differ from those of the resist pattern during the etching operation, as an etching depth or amount is varied depending upon etching conditions. Due to the pattern forming error or deviation as described above, it is extremely difficult to obtain a marker having intended dimensions with high reliability.

Consequently, there inevitably arises a change in the relationship between the width dimension of the marker and the distance between the currently ground surface of the core blank and the nominal grinding depth position, whereby the required residual depth of grinding to be further effected, which is determined based on the width dimension of the marker, cannot be relied upon to establish the nominal or intended depth dimension of the magnetic gap with sufficiently high accuracy.

SUMMARY OF THE INVENTION

It is therefore an object of the present invention to provide a method of grinding a core blank which provides at least one head core each used for a magnetic head, which method uses at least one marker formed in the core blank for easily establishing a nominal depth dimension of a magnetic gap of the head core with high accuracy.

The above object may be accomplished according to the principle of the present invention, which provides a method of grinding a core blank which yields at least one head core each used for a magnetic head, each head core having an annular magnetic path having a magnetic gap, the core blank having a working surface which is ground to thereby give a sliding surface of each head core that is opposed to a magnetic recording medium for sliding contact therewith, the method comprising the steps of: forming at least one marker by photolithography so that the marker(s) is/are embedded in the core blank, each marker having two edges which are spaced from each other in a direction of width of the magnetic gap, by a first distance that continuously varies in a direction of depth of the magnetic gap, the two edges of each marker being located on the same side as viewed in the direction of width of the magnetic gap; and measuring, upon grinding of the core blank, the first distance between the two edges of each marker which is exposed on the working surface of the core blank under grinding, which first distance varies with a second distance between the working surface under grinding and a grinding depth line which determines a nominal depth dimension of the magnetic gap, so as to determine a required residual depth of grinding which is to be further effected to establish the nominal depth dimension of the magnetic gap.

According to the method of the present invention, the required depth of grinding to be further effected on the core blank is determined based o the distance between the two edges of each marker which are located on the same side as viewed in the direction of width of the magnetic gap, which distance is measured at the currently ground surface of the core blank on which the marker is exposed. Since the above distance between the two edges of the marker suffers from a minimum measuring error due to positioning error or forming deviation associated with the marker or an etching pattern used for the marker, the required residual grinding depth can be accurately determined so as to establish the nominal depth dimension of the magnetic gap of each head core with high accuracy and reliability.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
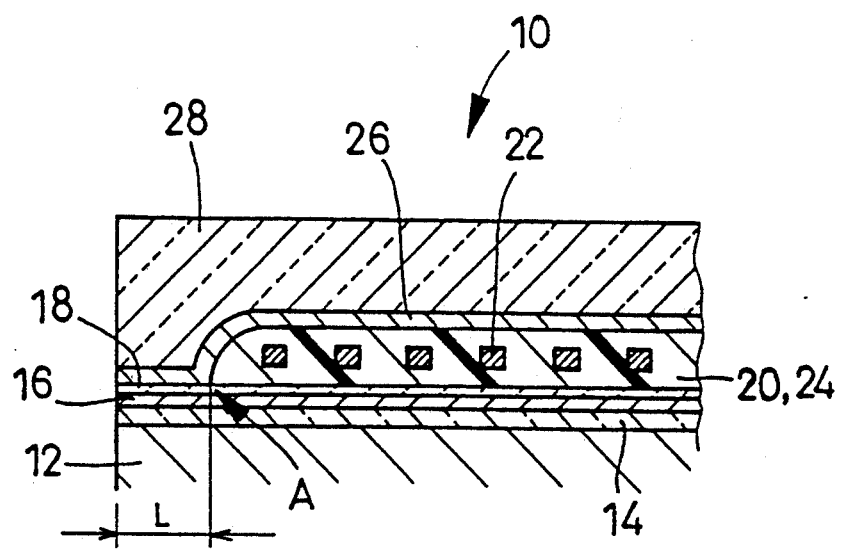
FIG. 1 is a cross sectional view showing a principal part of one example of a head core for a thin-film type magnetic head, which is obtained from a core blank that is ground according to one embodiment of the present invention.

There will be described one embodiment of the present invention when applied to production of a head core 10 for a thin-film type magnetic head, as shown in FIG. 1. Generally, the head core 10 is obtained from a core blank 30 (FIG. 2F) which yields one or more head cores 10 for the thin-film type magnetic head, after grinding and other finishing steps. Referring to FIGS. 2A through 2F, there will be described a known method of fabricating each head core 10 formed from the core blank 30.

Figure 2A:
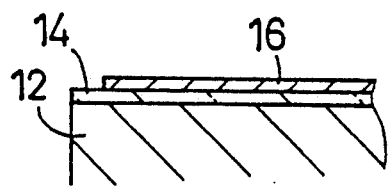
FIGS. 2A-2F are views showing process steps for fabricating the core blank which provides the thin-film type magnetic head cores of FIG. 1.
Figure 2B:
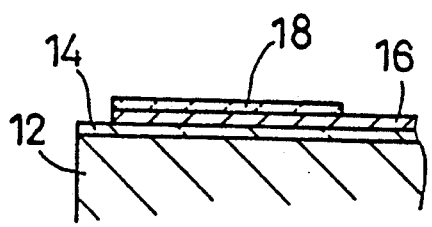
Figure 2C:
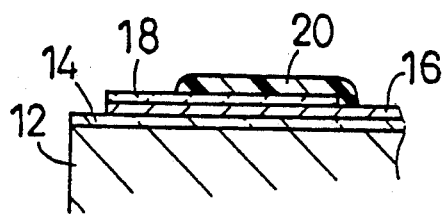
Figure 2D:
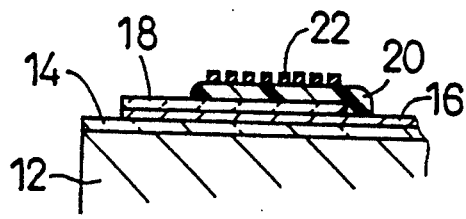
Figure 2E:
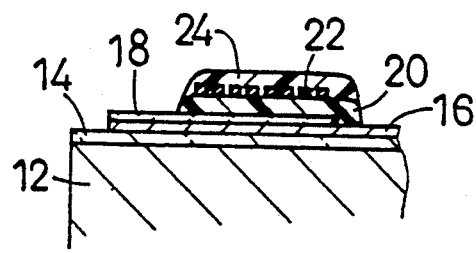

Referring first to FIG. 2A, a lower insulating layer 14 made of alumina, for example, is formed by sputtering on a substrate 12 made of a ceramic or other material, and lower magnetic poles 16 made of Permalloy, for example, are then formed by plating on an upper surface of the insulating layer 14, utilizing a photolithography technique. Then, a gap-forming insulating layer 18 made of $SiO_2$ is formed by sputtering so as to cover the lower magnetic poles 16, as shown in FIG. 2B. Thereafter, an insulating layer 20 is formed on the insulating layer 18, by coating the insulating layer 18 with a photoresist, as shown in FIG. 2C. Then, a coil 22 is formed by plating on the insulating layer 20, utilizing a photolithography technique, as shown in FIG. 2D. Further, an insulating layer 24 is formed in the same manner as the insulating layer 20, so as to cover the coil 20, as shown in FIG. 2E. Thereafter, upper magnetic poles 26 made of Permalloy, for example, are formed in the same manner as the lower magnetic poles 16, and an upper protective layer 28 is formed in the same manner as the lower insulating layer 14, so as to cover the entire area of the outer surface of the upper magnetic poles 26, as shown in FIG. 2F.

Figure 2F:
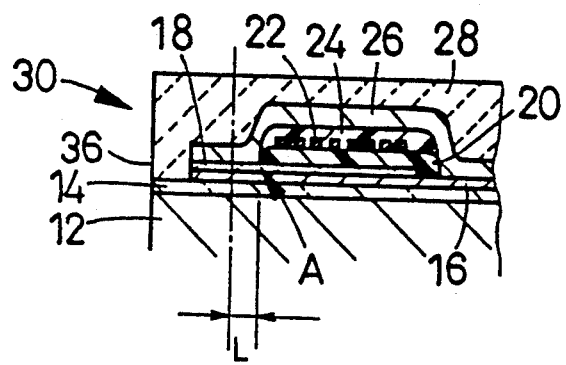

In this manner, the core blank 30 for forming the head cores 10 used for the thin-film type magnetic head is obtained as shown in FIG. 2F. In each of the head cores 10, the corresponding lower and upper magnetic poles 16, 26 cooperate with each other to provide an annular or closed magnetic path, which has a magnetic gap formed between the lower and upper magnetic poles 16, 26 such that the magnetic gap is filled with the gap-forming layer 18 interposed between these magnetic poles 16, 26.

The core blank 30 has a working surface 36 on one side thereof which gives a sliding surface of each head core 10 that is opposed to a magnetic recording medium for sliding contact therewith. The working surface 36 of the core blank 30 is subjected to a grinding operation, such as lapping, so that the depth dimension "L" of the magnetic gap of each head core is controlled to a predetermined nominal value, whereby the head core 10 having the nominal gap depth "L" is obtained as shown in FIG. 1. In FIG. 1, reference character "A" denotes the innermost end of the magnetic gap.

Figure 3:
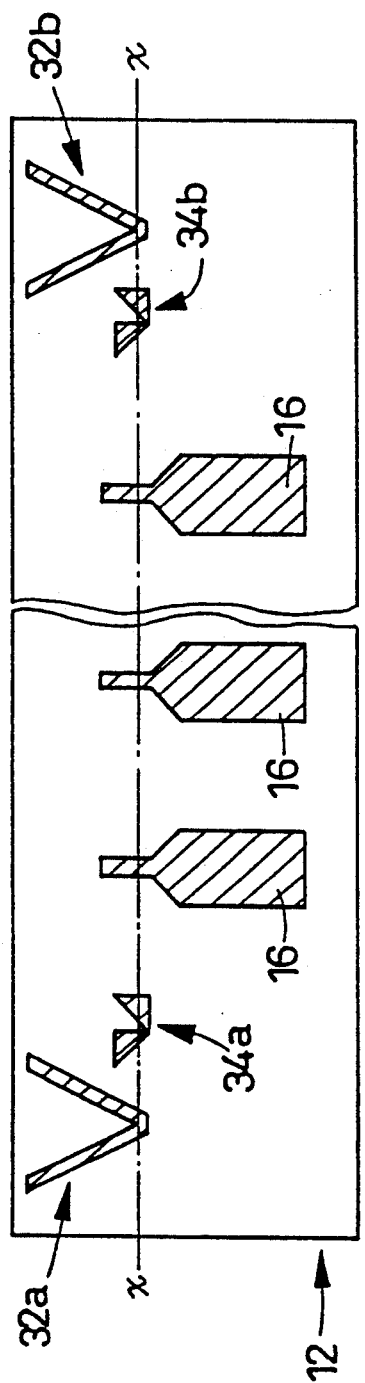
FIG. 3 is a plan view showing the process step of FIG. 2A for forming lower magnetic poles on a substrate, together with first and second markers used according to the present invention.

In the above-described process of fabricating the core blank 30 for forming the head cores 10 for the thin-film type magnetic head, first markers 32a, 32b and second markers 34a, 34b are formed on the substrate 12 according to the present invention, in the process step of forming the lower magnetic poles 16 on the substrate 12, as shown in FIG. 3.

Each of the lower magnetic poles 16 is formed by a generally known method as described below in detail. Initially, a base film for plating, which is made of Permalloy or other metal, is formed on the substrate 12 on which the lower insulating layer 14 has been formed. Then, a photoresist is applied by coating the entire surface of the base film, and is subjected to exposure and development while using a suitably patterned photomask, whereby the base film is exposed at its portion corresponding to a pattern of the lower magnetic poles 16 to be formed. Subsequently, Permalloy or other metal is applied by electroplating to the exposed portion of the base film which serves as an electrode. Then, the photoresist is removed. Thereafter, the Permalloy layer including the base film and electrolytic plating layer formed on the substrate 12 is etched by ion milling, by an amount corresponding to the thickness of the base film, whereby the base film is removed. Thus, the intended lower magnetic poles 16 are formed by the plating layer on the substrate 12. Generally a plurality of lower magnetic poles 16 are formed in an array on the substrate 12 so as to extend in parallel with each other, such that the magnetic poles 16 are equally spaced apart from each other, as shown in FIG. 3. Then, the gap-forming layer 18 and other layers 20, 24, 26, 28 and coil 22 are formed on the lower magnetic poles 16, and the working surface 36 of the core blank 30 is then ground. In the next step, the ground core blank 30 having the substrate 14 is cut into individual head cores 10 each having these layers and coil 16, 18, 20, 22, 24, 26, 28 formed on the substrate 14.

Upon formation of the lower magnetic poles 16 as described above, the first and second markers 32, 34 in the form of plating layers are also formed on the substrate 12, by electroplating using the same photolithography technique as used for forming the lower magnetic poles 16.

The first and second markers 32, 34 consist of a pair of first and second markers 32a, 34a and a pair of first and second markers 32a, 34b, which pairs are respectively formed at or near the opposite ends of the array of the lower magnetic poles 16, as viewed in the longitudinal direction of the substrate 12. The first and second markers 32a, 32b, 34a, 34b are positioned on the substrate 12, such that the positional relationship of the markers 32a, 34a is the same as that of the markers 32b, 34b, and such that these two pairs of markers have the same positional relationship with respect to the plane of the grinding depth indicated by line x—x in FIG. 3, which determines a desired or nominal depth dimension of the magnetic gap of each of the head cores which include the respective lower magnetic poles 16. In other words, if the pair of the first and second markers 32a, 34a at one end of the array of the lower magnetic poles 16 were displaced or shifted in the direction parallel to the line x—x, the markers 32a, 34a would overlap or align with the first and second markers 32b, 34b formed at the other end of the array of the lower magnetic poles 16.

Figure 4:
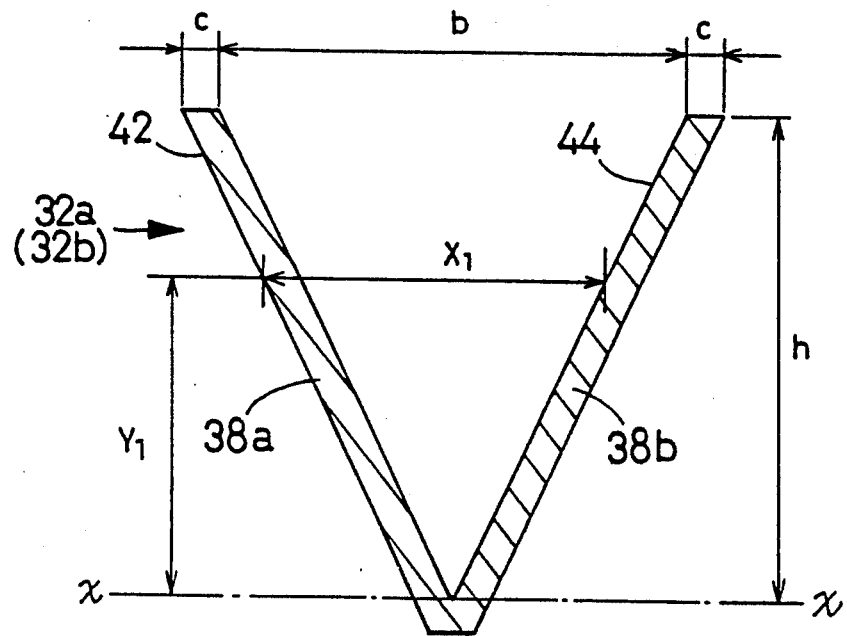
FIG. 4 is a view showing one of the first markers formed in the process step of FIG. 2B.

The first markers 32a, 32b have the identical shape, i.e., are both formed in V-shape, each consisting of two straight strokes or segments 38a, 38b each having a predetermined width "c", as shown in an enlarged plan view of FIG. 4. These first markers 32a, 32b are formed on a cut-off portion of the substrate 12 which is to be removed by grinding, with a height dimension enough to reach the grinding depth line x—x. The spacing between the two straight segments 38a, 38b continuously varies in the grinding direction, more precisely, the spacing continuously increases in a direction away from the grinding depth line x—x. Namely, the spacing between the lines 38a, 38b increases as the distance from the grinding depth line x—x increases.

In this particular embodiment, each of the first markers 32a, 32b forms therein an isosceles triangle in which the angle formed by the two straight segments 38a, 38b is determined such that the triangle has a base "b" at an opening of the V-shape of the marker 32a (32b), and a height "h" which is equal to the base "b", and such that the height "h" of the triangle extends in the grinding direction. Further, the apex of the triangle is positioned on the grinding depth line x—x.

The second markers 34a, 34b have the identical shape, that is, each second marker 34a (34b) consists of a first right-angled isosceles triangle ABC, and a second right-angled isosceles triangle DEF which is obtained by rotating the triangle ABC by 90° about an apex C, as shown in an enlarged plan view. This second marker 34a (34b) is formed such that the grinding depth line x—x crosses the base BC of the triangle ABC and the base EF of the triangle DEF, and such that the spacing between these bases BC and EF continuously varies in the grinding direction, viz., the spacing continuously increases in a direction away from the grinding depth line x—x. Namely, the spacing between the bases BC and EF increases as the distance from the grinding depth line x—x increases.

In the second marker 34a, 34b, in particular, the base BC of the triangle ABC cooperates with the base EF of the triangle DEF to form a right-angled isosceles triangle BCE (BFE) which has a height AC (AF) extending in the grinding direction.

In the manner as described above, the first and second markers 32a, 32b, 34a, 34b are formed concurrently with the lower magnetic poles 16. In the subsequent process steps for forming the insulating layers 20, 24 and the upper protective layer 28 of each head core 10, the first and second markers 32a, 32b, 34a, 34b are covered by these layers 20, 24, 28, and thus embedded in the core blank 30.

Figure 6:
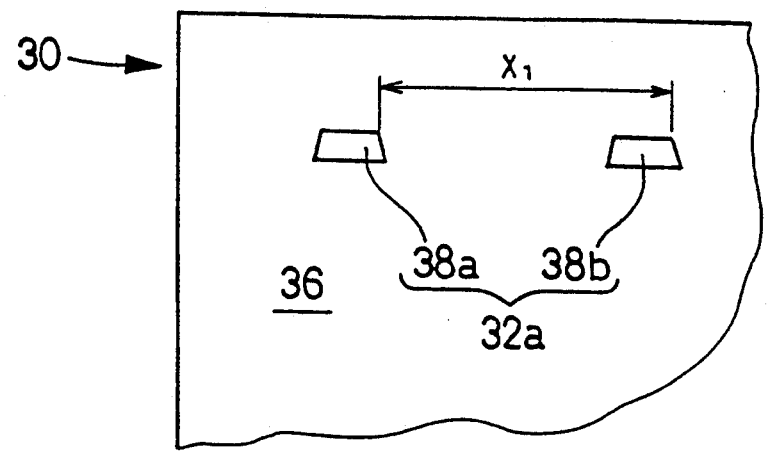
FIG. 6 is a plan view showing a working surface of the core blank formed as shown in FIGS. 2A-2F, which working surface is ground according to the method of the present invention.

Accordingly, during the grinding operation effected on the core blank 30 so as to determine the depth dimension of the magnetic gap of each head core obtained from the core blank 30, the first markers 32a, 32b and the second markers 34a, 34b are exposed on the working surface 36 of the core blank 30, as shown in FIG. 6 by way of example, and ground and removed little by little concurrently with stock removal of the core blank 30.

During this grinding operation, a distance between the working surface 36 under grinding and the grinding depth line x—x is represented by each instantaneous spacing "$X_1$" between the two straight segments 38a, 38b of each first marker 32a, 32b which are exposed on the working surface 36, and in a terminal period of the grinding process, by each instantaneous spacing "$X_2$" between the bases BC, EF of the triangles ABC and DEF of each second marker 34a, 34b. Accordingly, the above distance up to the grinding depth line x—x, that is, the required depth of the grinding that should be further effected to establish the nominal depth dimension of the magnetic gap, can be calculated by measuring the spacings "$X_1$" and "$X_2$".

In this connection, the spacing "$X_1$" between the two straight segments 38a, 38b of the first marker 32a (32b) and the spacing "$X_2$" between the bases BC, EF of the second marker 34a (34b) are determined by measuring respective distances between edges of the straight segments 38a, 38b and edges of the bases BC, EF of the triangles ABC and DEF, all of which are located on the same side as viewed in the direction of width of the magnetic gap, i.e., as viewed in the direction in which these straight segments 38a, 38b and the bases BC, EF are spaced apart from each other.

More specifically described referring to FIG. 4 showing the first marker 32a, 32b, the distance between the working surface 36 as being ground and the grinding depth line x—x is calculated by measuring the distance "$X_1$" between an outer edge 42 of the first straight segment 38a and an inner edge 44 of the second straight segment 38b. Namely, in the instant embodiment as shown in FIG. 4, the base "b" of the triangle formed inside the marker 32a (32b) is made equal to the height "h" of the triangle. Therefore, the distance "$Y_1$" (i.e., residual depth of grinding) between the currently ground surface 36 and the grinding depth line x—x is obtained by the following formula (1) where each of the first and second segments 38a, 38b has the width "c" of 10 μm:

$$Y_1 = X_1 - 10\mu m \qquad (1)$$

Figure 5:
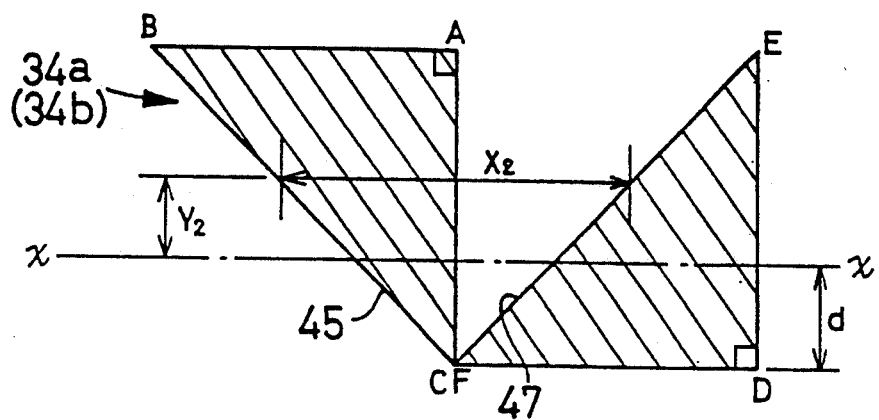
FIG. 5 is a view showing one of the second markers formed in the process step of FIG. 2B.

Referring next to FIG. 5 showing the second marker 34a, 34b, the distance between the working surface 36 under grinding and the grinding depth line x—x is calculated by measuring the distance "$X_2$" between an edge 45 of the base BC of the first triangle ABC and an edge 47 of the base EF of the second triangle DEF. Namely, in the instant embodiment wherein the triangle CEB takes the form of a right-angled isosceles triangle, the distance "$Y_2$" between the currently ground surface 36 and the grinding depth line x—x is obtained by the following formula (2) where "d" represents a distance between the apex C of the triangle CEB and the grinding depth line x—x:

$$Y_2 = (X_2 - 2d)/2 \qquad (2)$$

During an etching operation for forming the markers 32a, 32b, 34a, 34b by the photolithography technique, the edges 42, 44, 45, 47 located on the same side as viewed in the direction of width of the magnetic gap (parallel to the line x—x) are shifted or displaced from the nominal positions by almost the same amount in the same direction, even if the distance between the first and second straight segments 38a, 38b and/or the sizes of the triangles ABC and DEF is/are changed by a positioning error of an etching pattern for each marker. Accordingly, the distance between the edges 42, 44 of the marker 32a, 32b and the distance between the edges 45, 47 of the marker 34a, 34b are hardly influenced by the shifting of the etching pattern for the relevant marker, since the edges 42, 44, 45, 47 are located on the same side as viewed in the direction of width of the magnetic gap.

It will be understood from the above description that the distance from the currently ground surface 36 to the grinding depth line x—x is accurately calculated according to the above formulas (1) and (2), based on the measured distances $X_1$, $X_2$ between the edges 42, 44 of the first marker 32a, 32b and between the edges 45, 47 of the second marker 34a, 34b, respectively. The thus obtained distances up to the grinding depth line x—x represents the required amount of stock removal by grinding, in other words, the required residual depth of grinding that should be further effected to establish the nominal depth dimension of the magnetic gap. In this arrangement, the grinding operation can be finished exactly at the grinding depth line x—x, to thereby establish the nominal or desired depth dimension "L" of the magnetic gap with sufficiently high accuracy.

During the grinding operation as described above, inclination of the working surface 36 as seen in the direction of width of the magnetic gap can be avoided by adjusting the grinding plane to correct the working surface 36 so as to zero or eliminate a difference(s) in the distance between the edges 42, 44 and/or edges 45, 47 at the two first markers 32a, 32b and/or two second markers 34a, 34b.

In this particular embodiment, the base "b" of the triangle formed in the first marker 32a, 32b is made equal to the height "h" of the same triangle, whereby the required depth of grinding to be effected, i.e., the distance "$Y_1$" between the currently ground surface 36 and the grinding depth line x—x, changes with the distance "$X_1$" between the edges 42, 44 of the first marker 32a, 32b measured at the currently ground surface 36, such that the ratio of an amount of change of the depth "$Y_1$" to that of the distance "$X_1$" is kept at 1:1. Thus, the required depth of grinding to be further effected can be easily calculated based on the measured distance between the edges 42, 44.

Further, in the instant embodiment, the ratio of the base EB of the triangle (ΔCEB) formed in the second marker 34a, 34b to the height CA of the same triangle is 2:1, whereby the required depth of grinding that should be further effected can be calculated with an error which is a half of a measuring error of the distance "$X_2$" between the edges 45, 47 of the second marker 34a, 34b as measured at the currently ground surface 36. With the residual grinding depth or amount thus determined, the desired or nominal depth dimension of the magnetic gap can be established with comparatively high accuracy.

Moreover, each of the first markers 32a, 32b is disposed alongside the corresponding second marker 34a, 34b in the instant embodiment. Accordingly, the required depth of grinding to be further effected is first calculated by means of the first markers 32a, 32b during an initial period of the grinding operation, and then calculated with further improved accuracy by means of the second markers 34a, 34b after the currently ground surface 36 reaches close to the nominal grinding depth (line x—x), so as to establish the final depth dimension of the magnetic gap by the finish grinding operation. Thus, the grinding operation of this embodiment can be performed with improved efficiency and accuracy.

While the present invention as applied to production of the head core 10 for thin-film type magnetic head has been described above, it is to be understood that the invention is not limited to the details of the illustrated embodiment, but may be otherwise embodied.

While two pairs of the first and second markers 32, 34 are respectively provided at the longitudinally opposite end portions of the core blank 30 in the illustrated embodiment, three or more pairs of the first and second markers may be provided in the longitudinal direction of the core blank 30 parallel to the plane of the working surface 36 of the core blank 30. The present invention may be also practiced by providing the core blank 30 with only the first markers 32a, 32b or the second markers 34a, 34b.

While the two kinds of the markers, that is, the first markers 32 and the second markers 34, are shown in the illustrated embodiment, the shape of the markers provided for practicing the present invention is by no means limited to those of the first and second markers 32, 34. It will be understood from the above description that the markers are only required to have two edges which are located on the same side as viewed in the direction of width of the magnetic gap, and which are spaced apart from each other in the gap-width direction by a distance that continuously varies in the grinding direction (the direction of depth of the magnetic gap). It is also to be understood that the edges of the markers may be either straight or curved provided the distance or spacing between the two edges as viewed in the gap-width direction is changed at a given rate or rates in the grinding direction. For instance, the marker may have two edges which are bent at certain points so that the rate of change of the distance between the two edges in the grinding direction is changed at the bent points.

While the first markers 32 and second markers 34 used in the illustrated embodiment are formed in the process step in which the lower magnetic poles 16 are formed, the formation of the markers in the core blank may be effected in any other process step. For instance, the markers may be formed in the process step in which the gap-forming insulating layers 18, coils 22, or upper magnetic poles 26 are formed, or may be formed in a separate exclusively process step. Further, the material of the markers is not limited to that of the illustrated embodiment, but may be suitably selected.

Figure 7:
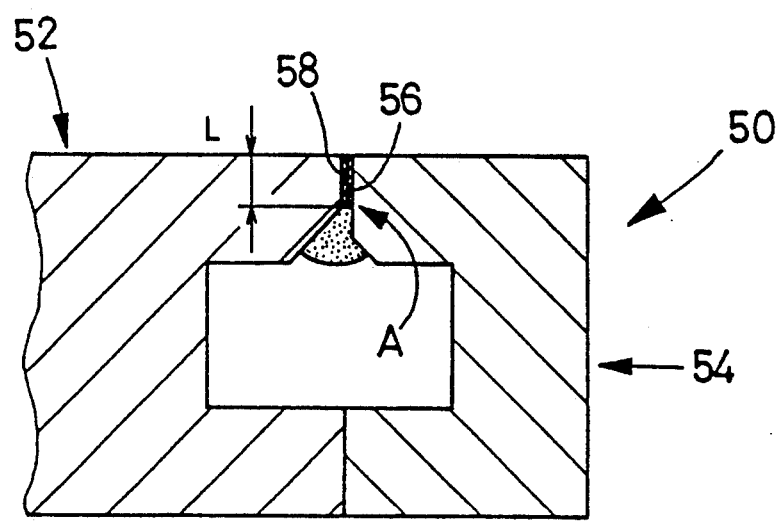
FIG. 7 is a cross sectional view showing a principal part of an example of a head core for a bulk-type magnetic head, which is obtained from a core blank that is ground according to the present invention.

While the present invention as applied to the grinding operation effected on the core blank which gives head cores for the thin-film type magnetic head has been described above in the illustrated embodiment, the principle of the present invention is equally applicable to a grinding operation effected on a core blank which gives head cores for the bulk-type magnetic head, and to production of various types of magnetic head cores. Referring next to FIGS. 7-9, there will be described another embodiment of the present invention as applied to a grinding operation on a core blank used for forming head core for the MIG (Metal-In-Gap) monolithic type magnetic head.

Referring first to FIG. 7, there is illustrated in cross section a part of a head core 50 for the MIG monolithic type magnetic head, which is produced according to the present invention. This head core 50 has a slider body 52, and a yoke portion 54 having a C-shaped cross section, which are butted and bonded together into an integral head core slider. The slider body 52 and the yoke portion 54 cooperate with each other to form an annular or closed magnetic path, which has a magnetic gap formed by interposing a gap-forming insulating layer 56 between the abutting surfaces of the slider body 52 and yoke portion 54. Metallic magnetic layer 58 having a high density of saturation magnetic flux is also provided at a gap-forming portion of the head core 50 which defines the magnetic gap, such that the film 58 is interposed between the slider body 52 and yoke portion 54. In the magnetic head core 50 of the instant embodiment, the position of an "apex" (designated at "A") for determining the depth dimension "L" of the magnetic gap is determined by the shape or dimensions of the abutting surface of the slider body 52.

Figure 8A:
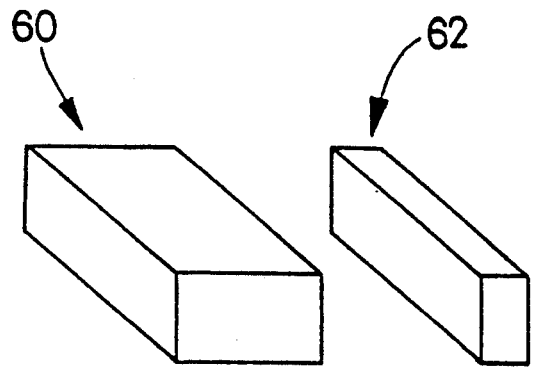
FIGS. 8A and 8B are views showing process steps for fabricating the core blank which provides the bulk-type magnetic head cores of FIG. 7.
Figure 8B:
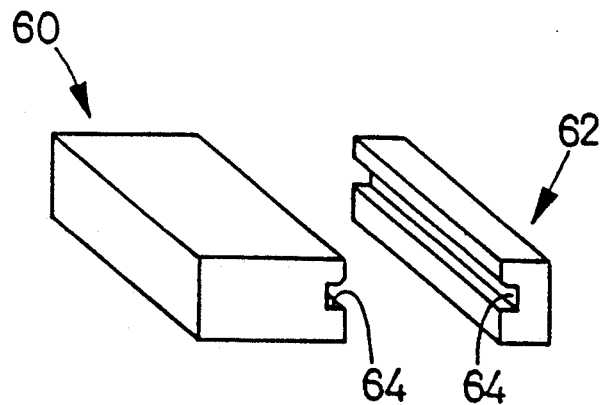
Figure 9:
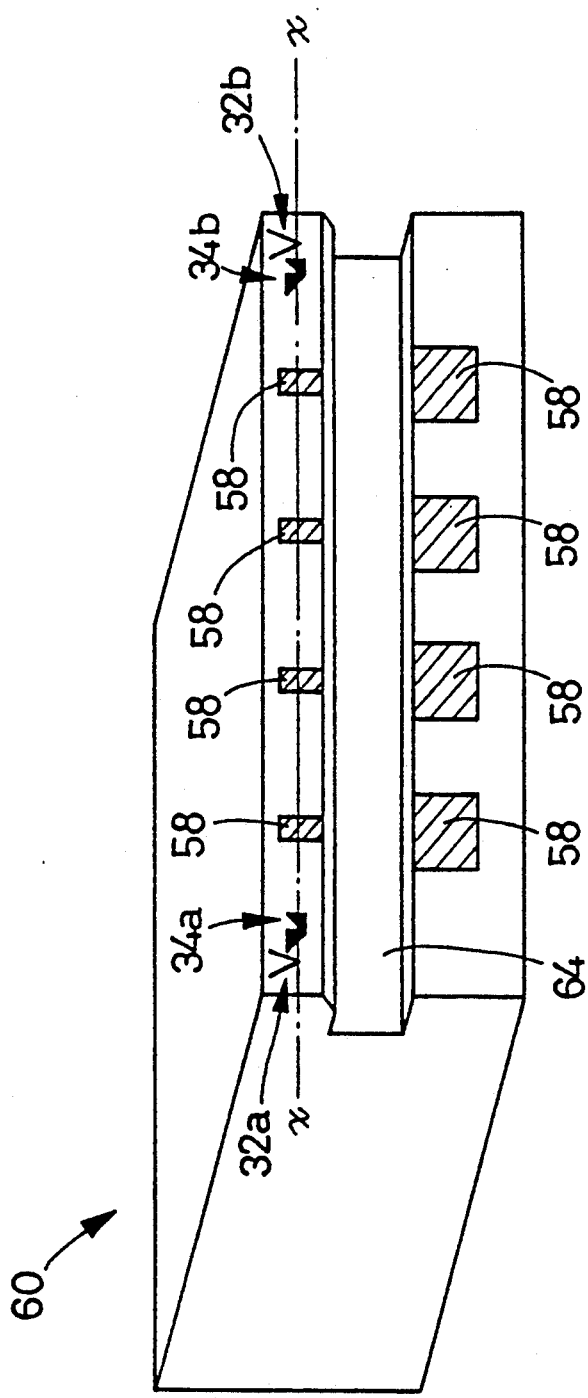
FIG. 9 is a view showing one of the process steps for fabricating the core blank for the magnetic head cores of FIG. 7, in which markers as well as metallic magnetic layers are formed on a first ferrite block.

To form the magnetic head cores 50 constructed as described above, a first ferrite block 60 which gives the slider bodies 52 and a second ferrite block 62 which gives the yoke portions 54 are first prepared as shown in FIG. 8A, and coil-winding grooves 64 are formed in the respective abutting surfaces of the first and second ferrite blocks 60, 62, as shown in FIG. 8B. Then, metallic magnetic layers 58 formed of Sendust, Permalloy or the like are formed on the abutting surface of the first ferrite block 60, as shown in FIG. 9. Thereafter, the gap-forming insulating layers 56 (not shown in FIG. 9) made of alumina or the like are formed by sputtering on the respective surfaces of the metallic magnetic layers 58, and the first and second ferrite blocks 60, 62 are then butted and bonded together by a bonding glass, to form an integral core blank for forming the head cores 50.

The thus formed core blank for the head cores 50 has a top surface or working surface 36 which is ground to thereby provide a sliding surface of each head core that is opposed to a magnetic recording medium for sliding contact therewith. The working surface 36 of the core blank is subjected to a grinding operation, such as lapping, so that the depth dimension "L" of the magnetic gap of each head core obtained from the core blank is controlled to a target or nominal value. Thus, the head core 50 having the nominal gap depth "L" as shown in FIG. 7 is obtained.

In the above-described process of fabricating the head cores 50 for the bulk-type magnetic head, the first markers 32a, 32b and the second markers 34a, 34b having the same shape as those used in the first embodiment are formed on the abutting surface of the first ferrite block 60, as shown in FIG. 9, in the above-described process step for forming the metallic magnetic layers 58 on the same surface of the ferrite block 60.

The metallic magnetic layers 58 as indicated above are formed in the following manner. Initially, a metallic magnetic material is applied by sputtering to substantially the entire area of the abutting surface of the first ferrite block 60. Then, a photoresist is applied to the entire surface of the thus formed metallic magnetic film, and is subjected to exposure and development while using a suitably patterned photomask, whereby a pattern of the photoresist corresponding to the photomask is formed so as to cover portions of the metallic magnetic film that correspond to the metallic magnetic layers 58 to be formed. Subsequently, the thus exposed portions of the metallic magnetic film are removed by etching, and the photoresist which serves as an etching mask is then removed. In this manner, intended metallic magnetic layers 58 are formed on the abutting surface of the first ferrite block 60.

Upon formation of the metallic magnetic layers 58 as described above, the first and second markers 32, 34 are concurrently formed on the abutting surface of the first ferrite block 60, by an etching method using the same photolithography technique as used for forming the metallic magnetic layers 58.

As in the first embodiment as described above, a pair of the first and second markers 32, 34 is formed on each of the longitudinally opposite end portions of the first ferrite block 60, such that the first markers 32 and the second markers 34 have respective predetermined positional relationships as indicated in FIGS. 4 and 5 of the first embodiment, with respect to each other and to the grinding depth line x—x (FIG. 9) provided on the first ferrite block 60.

During the grinding operation effected on the magnetic head core blank formed by butting and bonding the first and second ferrite blocks 60, 62 together, the first markers 32a, 32b and the second markers 34a, 34b are exposed on the top surface or working surface 36 of the core blank. Therefore, the distance between the working surface 36 under grinding and the grinding depth line x—x, that is, the required residual depth of grinding that should be further effected can be readily calculated by measuring the distance between the edges 42, 44 of the two straight segments 38a, 38b of the first marker 32a, 32b or the distance between the bases BC and EF of the triangles ABD and DEF of the second marker 34a, 34b.

The distance between the edges 42, 44 of the straight segments 38a, 38b of the first marker 32a, 32b and the distance between the bases BC and EF of the triangles ABC and DEF of the second marker 34a, 34b are hardly influenced by the positioning error of an etching pattern used for forming the markers 32, 34. Accordingly, the required depth of grinding to be further effected is accurately determined so as to establish the desired or nominal depth dimension "L" of the magnetic gap of the resultant head core 50 with high accuracy. Thus, the instant embodiment yields the same effects as obtained in the first embodiment.

Further, in this particular embodiment, the first and second markers 32, 34 are formed on the abutting surface of the first ferrite block 50 whose dimensions determine the position of the apex "A" that in turn determines the lowermost end of the magnetic gap. Accordingly, the first and second markers 32, 34 can be easily and highly accurately positioned with respect to the grinding depth line x—x, effectively avoiding errors in the depth of the resultant magnetic gaps due to deviation of the markers 32, 34 from the predetermined nominal positions.

It will be understood that various modifications or changes as illustrated above with respect to the first embodiment can be readily applied to the instant embodiment of the present invention as applied to the grinding operation on the core blank for the bulk-type magnetic head.

Figure 10:
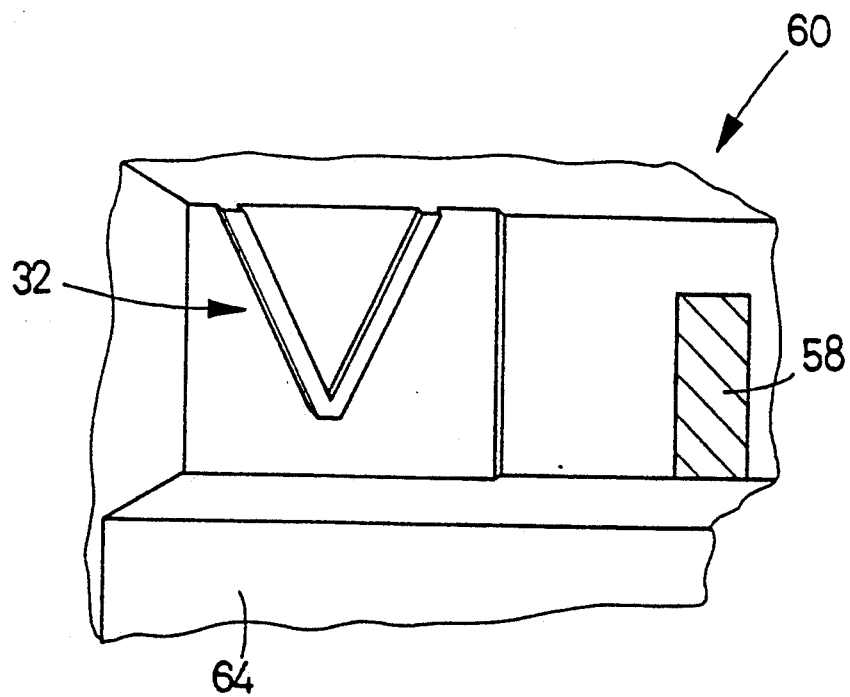
FIG. 10 is a perspective view corresponding to that of FIG. 9, showing a modification of the embodiment of FIGS. 7-9.

For instance, the marker 32 may be formed on the abutting surface of the first ferrite block 60 as shown in FIG. 10, in the following manner. Initially, a photoresist is applied to the abutting surface of the first ferrite block 60, and is then subjected to exposure and development while using a suitably patterned photomask, to thereby remove a portion of the photoresist other than its patterned portion corresponding to the marker 32 to be formed. Then, the first ferrite block 60 is processed by a chemical etching method using an aqueous solution of phosphoric acid, for example, so that the marker 32 is formed directly and integrally with the abutting surface of the ferrite block 60.

It is also to be understood that the present invention may be embodied with various other changes, modifications and improvements, which may occur to those skilled in the art, without departing from the spirit and scope of the invention as defined in the following claims.

What is claimed is:

1. A method of grinding a core blank which yields at least one head core each used for a magnetic head, each of said at least one head core having an annular magnetic path having a magnetic gap, said core blank having a working surface which is ground to thereby give a sliding surface of said each head core that is opposed to a magnetic recording medium for sliding contact therewith, said method comprising the steps of:

forming at least one marker by photolithography so that said at least one marker is embedded in said core blank, said at least one marker consisting of a first right-angled isosceles triangle, and a second right-angled isosceles triangle which is obtained by rotating said first right-angled isosceles triangle by 90° about an apex thereof, said first and second right-angled isosceles triangles having respective bases as edges of said marker which are spaced from each other in a direction of width of said magnetic gap, by a first distance that continuously varies in a direction of depth of said magnetic gap, said edges of said each marker being located on the same side as viewed in the direction of width of said magnetic gap; and measuring, upon grinding of said core blank, said first distance between said edges of said each marker which is exposed on said working surface of said core blank under grinding, which first distance varies with a second distance between said working surface under grinding and a grinding depth line which determines a nominal depth dimension of said magnetic gap, so as to determine a required residual depth of grinding which is to be further effected to establish the nominal depth dimension of the magnetic gap;

wherein said first and second triangles are positioned such that said grinding depth line crosses said respective bases, and said first distance between said respective edges of said each marker continuously increases with an increase in said second distance between said working surface and said grinding depth line.

2. A method of grinding a core blank according to claim 1, wherein said each head core includes a lower magnetic layer and an upper magnetic layer which define said magnetic gap therebetween, said at least one marker being formed concurrently with said lower magnetic layer.

3. A method of grinding a core blank which yields at least one head core each used for a magnetic head, each of said at least one head core having an annular magnetic path having a magnetic gap, said core blank having a working surface which is ground to thereby give a sliding surface of said each head core that is opposed to a magnetic recording medium for sliding contact therewith, said method comprising the steps of:

forming at least one first marker and at least one second marker by photolithography so that said markers are embedded in said core blank, each of said at least one first marker consisting of two straight segments each having a predetermined width, said two straight segments meeting each other to form a V-shape on a grinding depth line, which determines a nominal depth dimension of said magnetic gap, and having respective edges defined by said two straight segments, each of said at least one second marker consisting of a first right-angled isosceles triangle, and a second right-angled isosceles triangle which is obtained by rotating said first right-angled isosceles triangle by 90° about an apex thereof, said first and second right-angled isosceles triangles having respective bases as edges of said second marker, said edges of said markers being spaced from each other in a direction of width of said magnetic gap by a first distance that continuously varies in a direction of depth of said magnetic gap, said edges of said markers being located on the same side as viewed in the direction of width of said magnetic gap; and measuring, upon grinding of said core blank, said first distance between said edges of said markers which is exposed on said working surface of said core blank under grinding, which first distance varies with a second distance between said working surface under grinding and said grinding depth line, so as to determine a required residual depth of grinding which is to be further effected to establish the nominal depth dimension of the magnetic gap;

wherein said first and second triangles of said at least one second marker are positioned such that said grinding depth line crosses said respective bases and said first distance between said respective edges of said markers continuously increases with an increase in said second distance between said working surface and said grinding depth line.

4. A method of grinding a core blank according to claim 3, wherein said two straight segments of said each first marker form therein a triangle having a base at an opening of said V-shape of the marker, and a height which is equal to said base and extends in a direction of grinding of the core blank.

5. A method of grinding a core blank according to claim 3, wherein said bases of said first and second right-angled isosceles triangles form a right-angled isosceles triangle having a base connecting said bases of the first and second triangles, and a height extending from a right-angles apex thereof toward said base in a direction of grinding of said core blank.

6. A method of grinding a core blank according to claim 3, wherein said at least one marker consists of two pairs of said first marker and said second marker, which are formed in longitudinally opposite end portions of said core blank, respectively.

7. A method of grinding a core blank according to claim 1, wherein said each head core includes a slider body and a yoke portion having respective abutting surfaces between which the magnetic gap is defined, said at least one marker being formed on the abutting surface of said slider body.

8. A method of grinding a core blank according to claim 1, wherein said at least one marker is formed by electroplating.

9. A method of grinding a core blank according to claim 1, wherein said at least one marker is formed by etching.

* * * * *